United States Patent
Keith et al.

(10) Patent No.: US 9,680,756 B2
(45) Date of Patent: Jun. 13, 2017

(54) EFFICIENT IN-BAND COMMUNICATION OF QUALITY-OF-SERVICE POLICIES BETWEEN VIRTUAL CLASSIFICATION DEVICES AND ENFORCEMENT DEVICES

(71) Applicant: Citrix Systems, Inc., Fort Lauderdale, FL (US)

(72) Inventors: Seth K. Keith, Scotts Valley, CA (US); Mustafa Kutluk Testicioglu, Mountain View, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 150 days.

(21) Appl. No.: 13/969,440

(22) Filed: Aug. 16, 2013

(65) Prior Publication Data

US 2015/0049604 A1 Feb. 19, 2015

(51) Int. Cl.
*H04L 12/851* (2013.01)

(52) U.S. Cl.
CPC .............................. *H04L 47/2441* (2013.01)

(58) Field of Classification Search
CPC ......... H04L 12/4641; H04L 2012/5651; H04L 47/10; H04L 47/20; H04L 47/2416; H04L 47/2441; H04L 47/32; H04L 47/24; H04L 47/724; H04L 12/5693
See application file for complete search history.

(56) References Cited

U.S. PATENT DOCUMENTS

| | | | |
|---|---|---|---|
| 7,142,563 B1* | 11/2006 | Lin | ........................ H04L 47/10 370/469 |
| 7,983,170 B2 | 7/2011 | Jackowski et al. | |
| 8,630,167 B2* | 1/2014 | Ashwood Smith | ........... 370/225 |
| 2007/0008967 A1* | 1/2007 | Bressler | ................ H04L 12/189 370/390 |

* cited by examiner

*Primary Examiner* — Ayaz Sheikh
*Assistant Examiner* — Debebe Asefa
(74) *Attorney, Agent, or Firm* — Finnegan, Henderson, Farabow, Garrett & Dunner LLP

(57) ABSTRACT

The embodiments are directed to methods and appliances for configuring a classification tree. The methods and appliances, can receive data packets having a source media access control (MAC) address. The methods and appliances can encode the source MAC address based on a determination of a message type. The methods and appliances can provide the encoded source MAC address to a quality-of-service (QoS) engine, wherein the encoded source MAC address configures the classification tree used by the QoS engine for authorizing the transmission of one or more data packets.

35 Claims, 14 Drawing Sheets

EFFICIENT IN-BAND COMMUNICATION OF QUALITY-OF-SERVICE POLICIES BETWEEN VIRTUAL CLASSIFICATION DEVICES AND ENFORCEMENT DEVICES

FIELD

Example embodiments relate to methods and systems for communicating network quality of service policies between a network classification device and a network enforcement device.

BACKGROUND

Large networks like the Internet, enterprise networks, metropolitan area networks, and cellular networks transport information using packets that are routed and switched through various segments of a network. Within these networks, users are provided with a plurality of user applications. User applications are becoming increasingly more complex, and the amount of data generated by these applications is increasing at an exponential rate. To accommodate user demand for data intensive applications, only two options exist. The first option entails increasing the capacity of existing networks, by adding more equipment to the infrastructure. This approach is not only expensive, but it also requires a significant amount of network downtime in order to properly install and troubleshoot the addition of new hardware and software to existing network infrastructure. The second option includes developing techniques to optimize the performance of the existing infrastructure.

Several traffic control techniques have been implemented to address this problem. The most rudimentary traffic control technique discards packets if the network is congested. More advanced techniques, including Transmission Control Protocol (TCP), and several variants of TCP use a sliding window that limits the total number of unacknowledged packets in transit from end-to-end. TCP, however, treats all network packets the same, which can result in an increase in the number of dropped packets as the number of connections increases. Each connection established between devices represents a connection established by an individual application. For example, a user might be using a downloading-software updates for a word processor, using an email client, using a web browser, hosting a website, streaming multimedia (e.g., video or audio), using an instant messaging program, running a virtual desktop program, etc. In this scenario, it is possible that eight or more different connections are formed.

In a virtual environment, however, a single machine can host applications for multiple users utilizing the same services. This results in a significant increase in the total volume of data, and the number of connections needed to support the required bandwidth of each application requesting access to the Internet. To ensure that data is successfully transmitted, techniques for organizing and prioritizing packets from different applications and different users can be used to ensure that the packets are not discarded. One way of dealing with this issue is to create a set of traffic classes that prioritize packets based on a set of metrics.

BRIEF DESCRIPTION OF THE DRAWINGS

Reference will now be made to the accompanying drawings showing example embodiments of this disclosure. In the drawings.

DETAILED DESCRIPTION

Figure 1:
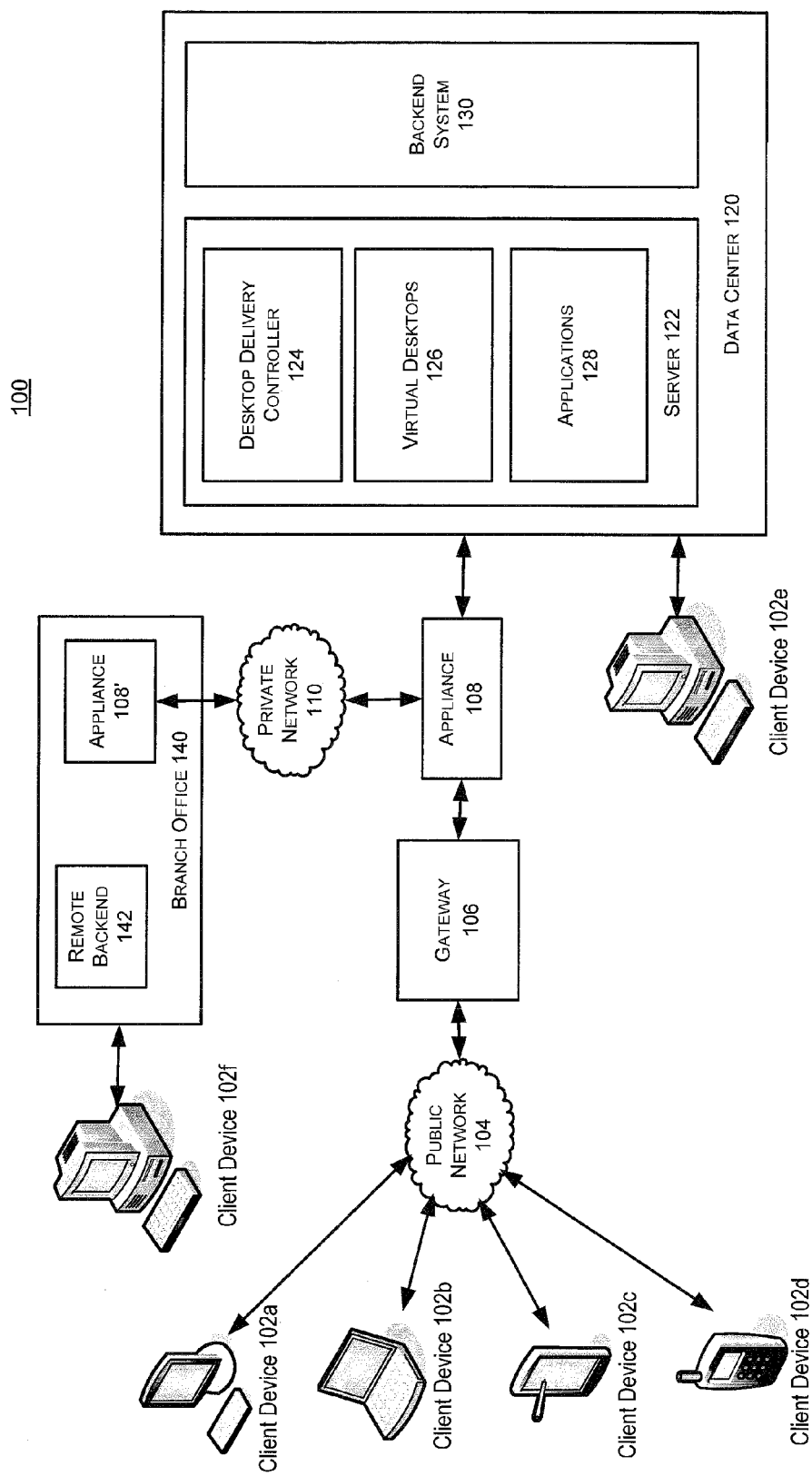
FIG. 1 is a block diagram of an exemplary network environment, consistent with embodiments of the present disclosure.

Reference will now be made in detail to the exemplary embodiments implemented according to the present disclosure, the examples of which are illustrated in the accompanying drawings. Wherever possible, the same reference numbers will be used throughout the drawings to refer to the same or like parts.

As stated above, to ensure that data is successfully transmitted, some techniques for organizing and prioritizing packets from different applications and different users can include creating a set of traffic classes that prioritize packets based on a set of metrics. These metrics can be determined by an administrator, or autonomously by the hosting device or the client device. For example, packets associated with users streaming multimedia data can be assigned a higher priority than packets associated with users who are sending emails because multimedia data is less tolerable to latency and jitter than email is. Prioritizing packets based on a set of metrics, as described in the previous example, is one way of providing each user with a certain Quality of Service (QoS).

Network traffic must be properly classified and prioritized in order to guarantee and enforce a QoS policy. The classification process, however, consumes a significant amount of system resources creating performance bottlenecks, thereby limiting the maximum throughput of the classification device. This issue can be addressed by partitioning the incoming packets amongst parallel virtual instances of the same classification device. After the packets have been classified, they can be prioritized using a hierarchical structure.

Each virtual instance sends QoS policy enforcement updates to a QoS enforcement device, to ensure the enforcement of the QoS policy. This, however, can present additional issues because frequent QoS policy enforcement updates can be necessary to guarantee enforcement for high data rate applications. Interspersing policy updates between user data packets cannot guarantee that the packets will arrive on time, or in the order necessary for the QoS enforcement device to enforce the policy. The frequency with which updates are delivered to the QoS enforcement device can be such that each packet arriving at a QoS enforcement device will be enforced according to the policy that is based on the classification of the arriving packet.

The task of communicating QoS policy enforcement information from distributed virtual classification devices without adding any additional network traffic can assist with complying with QoS policies. To create and enforce a QoS policy in a distributed virtual environment, the QoS policy framework specified in each classification device is identical. Each classification device relies on classification rules to learn about and classify network traffic into classification trees such as the one shown in FIG. 4). Nodes 421-424, 431-434, 441-444, and 420, 430, and 440 in FIG. 4 can represent a service class of packets classified by classifier 311 in FIG. 3.

Classification devices can be identical and rely on traffic analysis to determine what class an individual network connection or packet belongs to. Each class can be configured with Quality of Service policy enforcement information describing the relationship between each node in the tree. To enforce the policy, the entire QoS configuration, as shown in FIG. 4, must be communicated rapidly and accurately to QoS enforcement device (e.g., QoS engine 310 of FIG. 3). To accomplish this, enforcement information is encoded in each classified application packet sent from classification device to QoS enforcement device.

FIG. 1 is a block diagram of an exemplary network environment 100. While exemplary network environment 100 is directed to a virtual network environment, it is appreciated that network environment 100 can be any type of network that communicates using packets. Network environment 100 can include one or more client devices 102, a public network 104, a gateway 106, an appliance 108, a private network 110, a data center 120, and a branch office 140.

One or more client devices 102 are devices that can acquire remote services from data center 120 through various means. Client devices 102 can communicate with data center 120 either directly (e.g., client device 102e) or indirectly through a public network 104 (e.g., client devices 102a-d) or a private network 110 (e.g., client device 102f). While client devices 102 are portrayed as a computer (e.g., client devices 102a, 102e, and 102f), a laptop (e.g., client device 102b), a tablet (e.g., client device 102c), and a mobile smart phone (e.g., client device 102d), it is appreciated that client device 102 could be any type of device that can send and receive signals to and from data center 120.

Gateway 106 is a physical device or is software that is part of a physical device that interfaces between two networks having different protocols. Gateway 106, for example, can be a server, a router, a host, or a proxy server. In some embodiments, gateway 106 can include or be coupled to a firewall separating gateway 106 from public network 104 (e.g., Internet). Gateway 106 has the ability to modify signals received from client device 102 into signals that appliance 108 and/or data center 120 can understand and vice versa.

Appliance 108 is a device that optimizes wide area network (WAN) traffic by including, for example, a QoS engine. In some embodiments, appliance 108 optimizes other types of network traffic, such as local area network (LAN) traffic or metropolitan area network (MAN) traffic. In an exemplary embodiment, appliances 108 and 108' optimize WAN network traffic data. In some embodiments, appliance 108 can be a virtual appliance. In some embodiments, a first appliance (e.g., appliance 108) works in conjunction with or cooperation with a second appliance (e.g., appliance 108') to optimize network traffic. For example, the first appliance may be located between the WAN and a corporate local area network (LAN; e.g., data center 120), while the second appliance can be located between a remote backend system 142 within the branch office (e.g., branch office 140) and a WAN connection. In some embodiments, the functionality of gateway 106 and appliance 108 can be located in a single physical device. Appliance 108 is further described below.

Data center 120 is a central repository, either physical or virtual, for the storage, management, and dissemination of data and information pertaining to a particular public or private entity. Data center 120 can be used to house computer systems and associated components, such as one or more physical servers, virtual servers, and storage systems. Data center 120 can include, among other things, one or more servers (e.g., server 122) and a backend system 130. In some embodiments, data center 120 can include gateway 106, appliance 108, or a combination of both.

Server 122 is an entity that can be represented by any electronic addressable format, and can exist as a single entity or a member of a server farm. Server 122 can be a physical server or a virtual server. In some embodiments, server 122 can include a hardware layer, an operating system, and a hypervisor creating or managing one or more virtual machines. Server 122 provides one or more services to an endpoint. These services include providing one or more applications 128 to one or more endpoints (e.g., client devices 102a-f or branch office 140). Applications 128 can include, for example, Windows™- and SAP™-based applications and computing resources.

In some embodiments, the services include providing one or more virtual desktops 126 that can provide one or more applications 128. Virtual desktops 126 can include hosted shared desktops allowing multiple users to access a single shared Remote Desktop Services desktop, virtual desktop infrastructure desktops allowing each user to have their own virtual machine, streaming disk images, a local virtual machine, individual applications (e.g., one or more applications 128), or a combination thereof.

Desktop delivery controller 124 is a device that enables delivery of services, such as virtual desktops 126 to client devices (e.g., client devices 102a-f or branch office 140). Desktop delivery controller 124 provides functionality required to manage, maintain, and optimize all virtual desktop communications.

Backend system 130 is a single or multiple instances of computer networking hardware, appliances, or servers in a server farm or a bank of servers and interfaces directly or indirectly with server 120. For example, backend system 130 can include Microsoft™ Active Directory, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle backend server, a SQL Server backend, and/or a dynamic host configuration protocol (DHCP). Backend system 130 can provide data, services, or a combination of both to data center 120, which can then provide that information via varying forms to client devices 102 or branch office 140.

Branch office 140 is part of a local area network that is part of the WAN having data center 120. Branch office 140 can include, among other things, appliance 108' and remote backend 142. In some embodiments, appliance 108' can sit between branch office 140 and private network 110. As stated above, appliance 108' can work with appliance 108. Remote backend 142 can be set up in similar manner as backend system 130 of data center 120. Client device 102f can be located on-site to branch office 140 or can be located remotely from branch office 140.

Figure 2A:
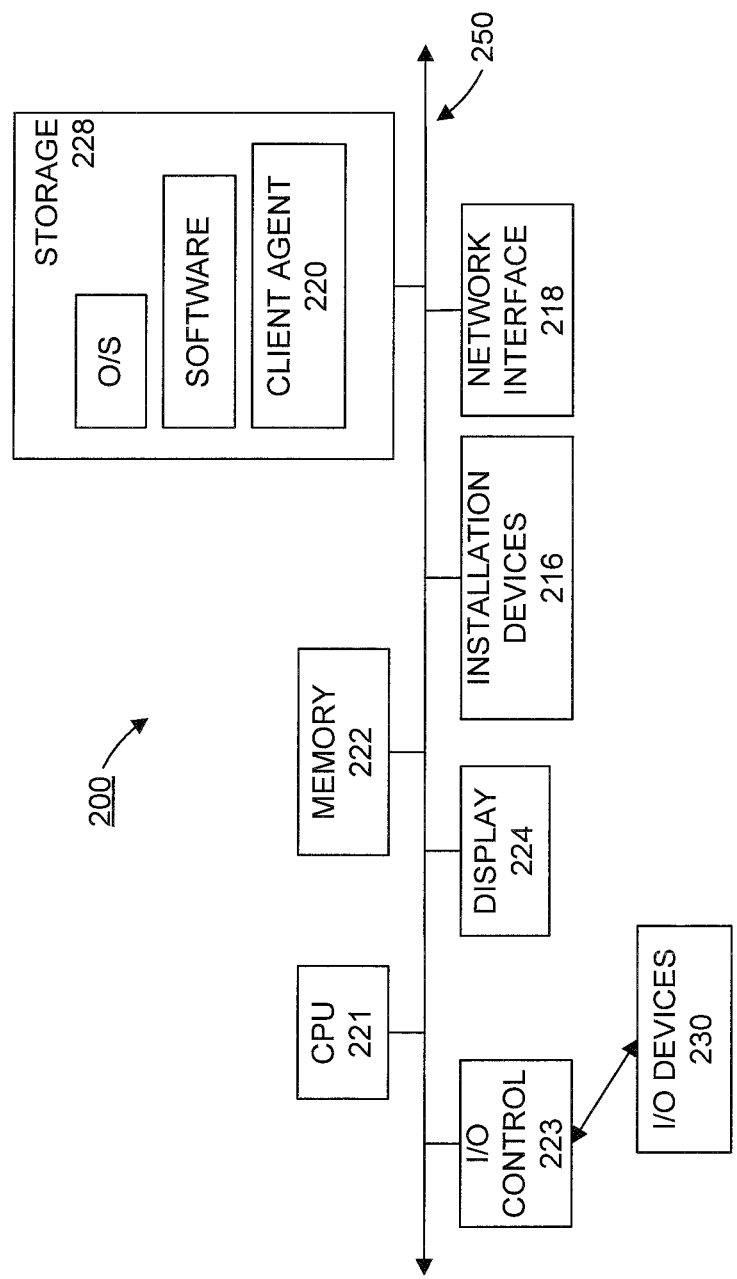
FIGS. 2A-2B are block diagrams of an exemplary computing device, consistent with embodiments of the present disclosure.
Figure 2B:
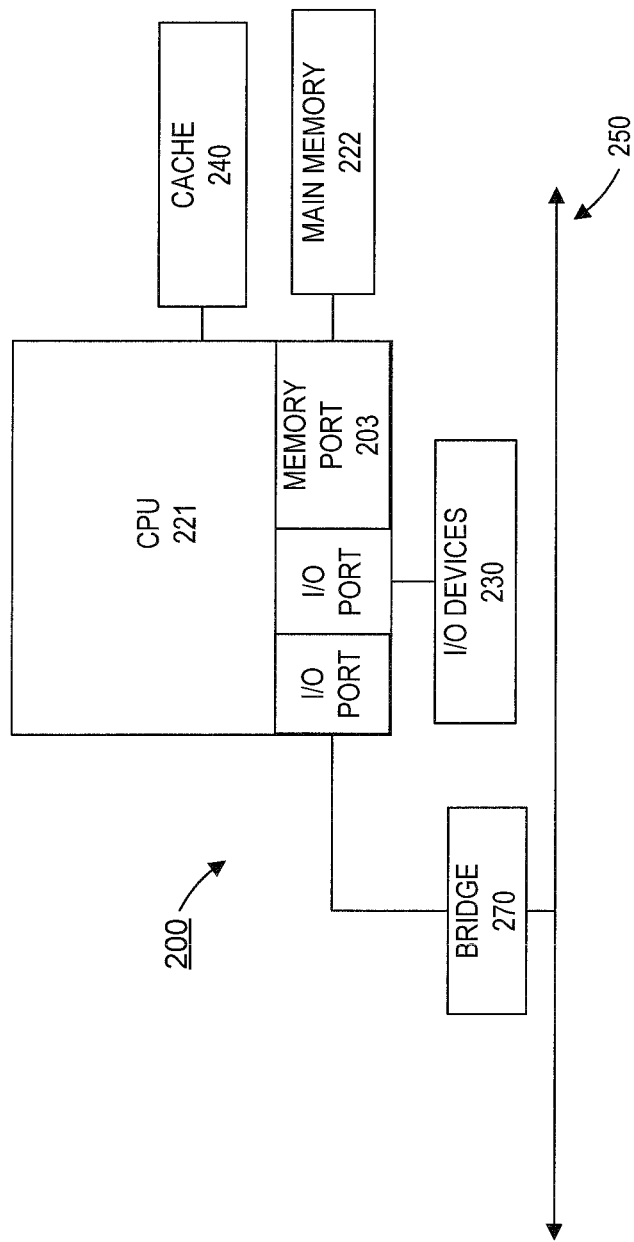

Appliances 108 and 108' and gateway 106 can be deployed as is, or executed on any type and form of computing device. Including any computer or networking device capable of communicating on any type and form of network described herein. As shown in FIGS. 2A-2B, each computing device 200 includes a central processing unit (CPU) 201 and a main memory 222. CPU 201 can be any logic circuitry that responds to and processes instructions fetched from the main memory 222. CPU 201 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory includes a tangible nontransitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), or a semiconductor memory. Main memory 222 can be one or more memory chips capable of storing data and allowing any storage location to be directly accessed by CPU 201. Main memory 222 can be any type of random access memory (RAM), or any other available memory chip capable of operating as described herein. In the exemplary embodiment shown in FIG. 2A, CPU 201 communicates with main memory 222 via a system bus 250. Computing device 200 can also include a visual display device 224 and an input/output (I/O) device 230 (e.g., a keyboard, mouse, or pointing device) connected through UO controller 223, both of which communicate via system bus 250. Furthermore, I/O device 230 can also provide storage and/or an installation medium for the computing device 200.

FIG. 2B depicts an embodiment of an exemplary computing device 200 in which CPU 201 communicates directly with main memory 222 via a memory port 203. CPU 201 can communicate with a cache 240 via a secondary bus, sometimes referred to as a backside bus. In some other embodiments, CPU 201 can communicate with cache 240 via system bus 250. Cache 240 typically has a faster response time than main memory 222. In some embodiments, CPU 201 can communicate directly with I/O device 230 via an I/O port. In further embodiments, I/O device 230 can be a bridge 270 between system bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

As shown in FIG. 2A, computing device 200 can support any suitable installation device 116, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Figure 3:
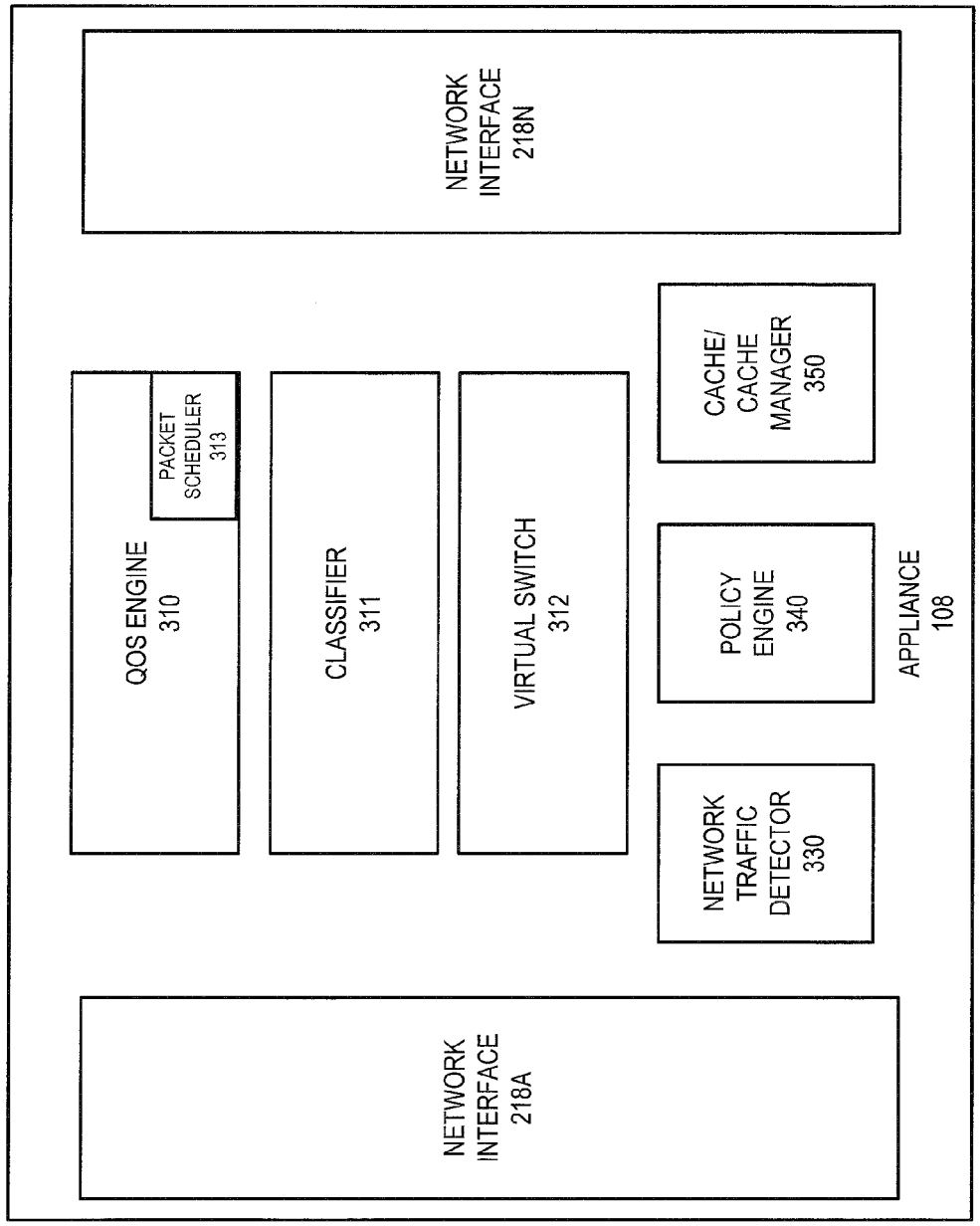
FIG. 3 is a block diagram of an exemplary computing device, consistent with embodiments of the present disclosure.
Figure 4:
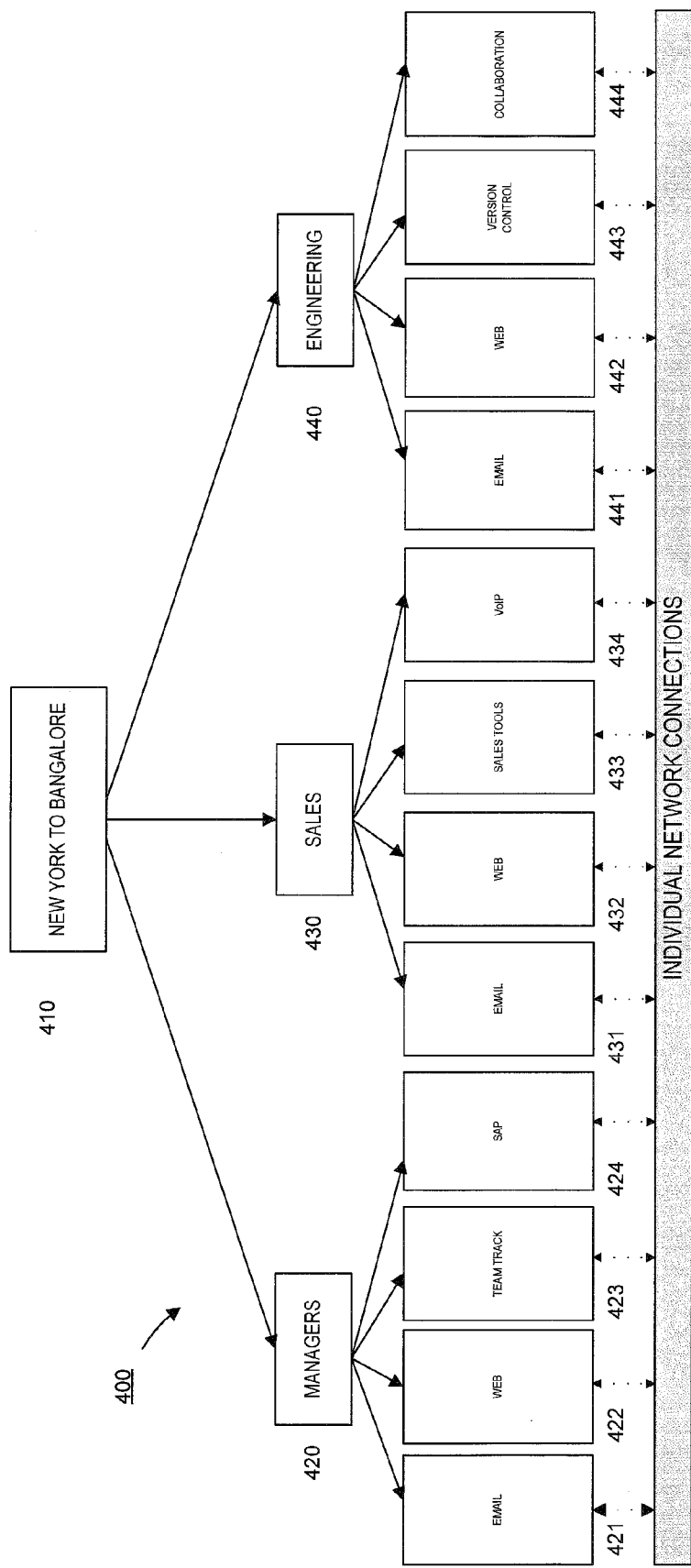
FIG. 4 is a block diagram of an exemplary classification tree, consistent with the embodiments of the present disclosure.

FIG. 3 is a block diagram of an exemplary appliance 108 of FIG. 1, consistent with embodiments of the present disclosure. Appliance 108 can include, among other things, one or more network interfaces 218A-N, a QoS engine 310, a classifier 311, a network traffic detector 330, a policy engine 340, and a cache with cache manager 350.

Network interface 218A-N intercepts user application packets, before they are sent through a network, and sends them to classifier 311 via network traffic detector 330. Network interface 218A can send packets to network traffic detector 330, or cache 350 if the queue in network traffic detector 330 becomes full. Network traffic detector 330 can detect network traffic packets of differing types, including but not limited to LAN packets, WAN packets, Wireless Local Area Network (WLAN) packets, private area network packets, etc. classifier 311 can be used to classify network packets according to the network that the packets originate from, the network that the packets are destined for, the applications that generated the packets, or the applications that the packets are destined for. Classifier 311 can be configured autonomously or by a network administrator. Although only one classifier is presented in FIG. 3, multiple instances of classifier 311 can be implemented in a single appliance 108.

Policy engine 340 can create policies, which can be used by QoS engine 310. The polices can be used to prioritize outgoing packets based on the classification scheme implemented by classifier 311. QoS engine 310 can prioritize outgoing network packets by enforcing the policies created by policy engine 340 before the outgoing network packets are sent to the outgoing interface of network interface 218A. QoS engine 310 can also include a packet scheduler 313.

Virtual switch 312, can be used to send packets between classifier 311 and QoS engine 310. Virtual switch 312 can also be used to send packets between multiple virtual instances of classifier 311, or between multiple virtual instances of classifier 311 and QoS engine 310.

In some embodiments, one or more classifiers 311 can construct the classification tree, such as classification tree 400 described below. One or more classifiers 311, can receive and analyze network traffic from network traffic detectors 330, and construct or revise the classification tree. In some embodiments, network traffic detector 330 analyzes the traffic and provides information to one or more classifiers 311. It is appreciated that one or more classifiers 311 and other classifiers can access the classification tree from a central location, in memory 222, storage 228, and/or memory/storage associated with one or more network interfaces 218A-N. In some other embodiments, one or more classifiers 311 and other classifiers can maintain separate copies of the classification tree, in separate memories, storage devices, and/or memory/storage devices associated with one or more network interfaces.

QoS engine 310 can construct or update a classification tree. QoS engine 310 can also maintain a copy of the classification tree that one or more classifiers 311 construct. The classification tree can be implemented, in part, by using the H-WF2Q+ algorithm or some other algorithms. It is appreciated that the classification tree can be stored in a central location, in memory 222, storage 228, and/or memory/storage associated with one or more network interfaces 218A-N, allowing QoS engine 310 and one or more classifiers 311 to access it. It is also appreciated that QoS engine 310 and the one or more classifiers 311 can have separate copies of the classification tree, in separate memories, storage devices, and/or memory/storage devices associated with one or more network interfaces.

FIG. 4 is an exemplary hierarchical network traffic classification tree 400, consistent with the embodiments presented in this disclosure. Classification tree 400 can assist with organizing network traffic according to a classification scheme specified by an administrator, classifier 311, other components of appliance 108, appliance 108, or another appliance 108'. For example, the classification scheme can include the Hierarchical Packet Fair Queuing (H-PFQ) algorithm, the Hierarchical Worst-case Fair Weighted Fair Queuing (H-WF$^2$Q) algorithm, the H-WF$^2$Q+ algorithm, or a variation thereof. The implementation of the classification tree can be a data structure constructed in any language, some of which include C++, Boost C++, Java, Python, PHP, Perl, Apple Core Foundation library, Go library, etc. It is appreciated that the classification tree can be implemented in firmware source code, hardware source code, or a combination of software source code, firmware source code, and/or hardware source code.

Classification tree 400 can be constructed by classifier 311. Classifier 311, after receiving network traffic from network traffic detector 330 and analyzing that traffic, can construct or revise classification tree 400. In some embodiments, network traffic detector 330 analyzes the traffic and provides information to classifier 311.

Classification tree 400 can include a link node 410, one or more service class nodes 420, 430, and 440, and one or more sub-service class nodes (e.g., sub-service class nodes 422 and 432). In some embodiments, one or more levels of sub-service class nodes can exist between a service class node (e.g., service class node 420) and connection nodes (e.g., individual network connections 450). Therefore, classification tree 400 can have more than 3 levels of hierarchy as shown in FIG. 4. Link node 410 can be implemented using one or more source code modules alone or in combination with one or more data structures (referencing its descendent nodes), all of which can be stored in memory 222, storage 228, and/or memory/storage associated with one or more network interfaces 218A-N.

Each internal node (i.e., service-class, sub-service-class, and service-class connection nodes) can represent a logical queue. QoS engine 310 can use these logical queues as a building block to organize how packets will be scheduled for transmission, based on the service classes and priority of these service classes in the classification tree. The organization of link node 410 and service class nodes 420A-N can be implemented using a classification algorithm, such as the WF$^2$Q+ queuing algorithm into a hierarchical structure like the upper nodes of classification tree 400 can be implemented using the H-WF$^2$Q+ algorithm. QoS engine 310 can prioritize the transmission of packets using the algorithm mentioned above by storing pending packets in one or more shared memory pools encompassing all of memory 222 or some portion thereof. Several single read single write queues can be created using memory 222.

Link node 410 can represent a physical link between different physical devices (e.g., New York to Bangalore), or a virtual circuit between different virtual or physical devices. Each service class node 420, 430, or 440 can represent different traffic classes classified by classifier 311. In some embodiments, service class nodes 420, 430, and 440 can be organized according to the data rates associated with different departments in an organization, supported by link node 410. For example, if link node 410 from New York to Bangalore has a bandwidth of 700 Gigabits per second (Gbps), data rates can be assigned to each department (e.g., Engineering 440 receives 100 Gbps, Sales 430 receives 200 Gbps, and Managers 420 receives 400 Gbps). In some embodiments, the data rates can be provided based on priority levels. For example, a priority level of "1," "2," and "4" could indicate that the service class nodes could correspond to data rates of 100 Gbps, 200 Gbps, and 400 Gbps, respectively, of a link having 700 Gbps. Data rates can be assigned by a network administrator, classifier 311, other components in appliance 108, appliance 108, or another appliance 108'.

In some embodiments, classifier 311 can create service class nodes 420, 430, 440 using different link metrics including: latency or jitter experienced by a packet as it traverses a link, number of link segments a packet is expected to traverse, average number of link segments a packet traverses, expected end-to-end delay, average end-to-end delay, throughput, department security requirements, or any user defined metrics describing the quality or characteristics of the link. For example, each service class can represent the security requirements associated with a department in the organization. A service class associated with a department, subject to a higher risk of network attacks, can have a higher level of protection assigned to it. A service class associated with a department with a lower risk of being attacked, can have a reduced level of protection assigned to it.

The children of service class nodes 420, 430, 440 can represent the traffic according to application type. For example, engineering 440 can classify traffic into four children nodes representing email, web, version control, and collaboration, whereas managers 420 classifies traffic by email, web, team track, and SAP. The children nodes can also be classified according to different link metrics as explained above for each parent node. In some embodiments, the sub-service class nodes share evenly the data rate of the service class node that they are connected to. For example, if manager service class node 420 has a data rate of 400 Gbps, sub-service class nodes 421, 422, 423, and 424, can each have a data rate of 100 Gbps. In some embodiments, sub-service class nodes can have different data rates.

In some embodiments, classifier 311 can create service classes that represent different link metrics, thereby allowing an administrator, classifier 311, other components of appliance 108, appliance 108, or another appliance 108' to construct a classification tree 400, with service classes that represent link metrics, instead of department and application types as shown in FIG. 4. For example, service classes 420, 430, and 440 can represent latency, jitter, and average number of link segments a packet traverses respectively.

The children nodes of latency node 420 and jitter node 430 can represent a latency and jitter threshold respectively for different link layer protocols on a given link. For example, children nodes of 420 and 440, can represent a tolerable amount of latency and jitter beyond which appliance 108 can begin to drop packets associated with Automatic Resolution Protocol (ARP), Neighbor Discovery Protocol (NDP), Open Shortest Path First (OSPF) protocol, Tunneling protocol, Point-to-Point protocol, Discovery and Configuration Protocol, or any other link layer protocol.

Although FIG. 4 only depicts three service classes, each of which spawns four children service class connection nodes, it should be noted that one skilled in the art can construct a classification tree 400 composed of different classes representing any number of combinations and permutations of different devices, applications running on a device, protocols used to communicate between devices, components within a device, or any combination of the aforementioned to classify components consistent with the embodiments of the present disclosure.

FIGS. 5A-6D depict packet segments used to encode messages for communicating classification information, consistent with the embodiments of the present disclosure. The packet segments displayed in FIGS. 5A-6D can represent the encoding of information at any layer of the Open Systems Interconnection (OSI) model including, the application layer, presentation layer, session layer, transport layer, data link layer, and network layer. Packet segment 500 can represent any field of the packet, or the entire packet itself. In an exemplary embodiment, packet segment 500 can represent the source Medium Access Control (MAC) address of a packet consistent with the data link layer of the OSI model. Packet segment 500 can include more, less, or exactly the same number fields as an OSI data link layer packet, or the packets segments presented in the embodiments described herein. The size of the fields in the packet segment 500, can be larger, smaller, or the same size as the fields in a data link layer packet corresponding to the standard OSI model, or the packet segments presented in the embodiments described herein. The fields within packet segment 500 can also be arranged in an order that is not consistent with the arrangement of fields in a data link layer packet according to the standard OSI model, or the packet segments presented in the embodiments described herein. For example, the source MAC address can occupy the destination MAC address field and vice versa. The fields in packet segment 500 can also be transmitted in an order that is not consistent with the order in which they are transmitted in a standard OSI data link layer packet, or the packet segments presented in the embodiments described herein. In some embodiments, packet segment 500 can also represent the encoding of binary information that does or does not correspond to one of the seven layers of the OSI model. The aforementioned also applies to any subfields, or fields nested in the fields of the packets segments illustrated in FIG. 5A-FIG. 6D. It should be noted that the bits in each field can be read from the least significant bit to the most significant bit. In some other embodiments, the bits in each field can be read from the most significant bit to the least significant bit.

In some embodiments, packet segment 500 replaces the source MAC address portion of entire network packet so that extra data is added to the network. In other embodiments, packet segment 500 can be transmitted alone without the remainder of a standard or nonstandard OSI data packet. For example, only the source MAC address field of a packet can be sent. In other embodiments, only the MAC header (i.e., source and destination MAC address) of a packet can be sent with the source MAC address encoded with the message. Moreover, in some embodiments, packet segment 500 can be included as a configuration information portion of a scheduling request, as further described in application Ser. No. 13/963,936, which is hereby incorporated by reference.

Figure 5A:
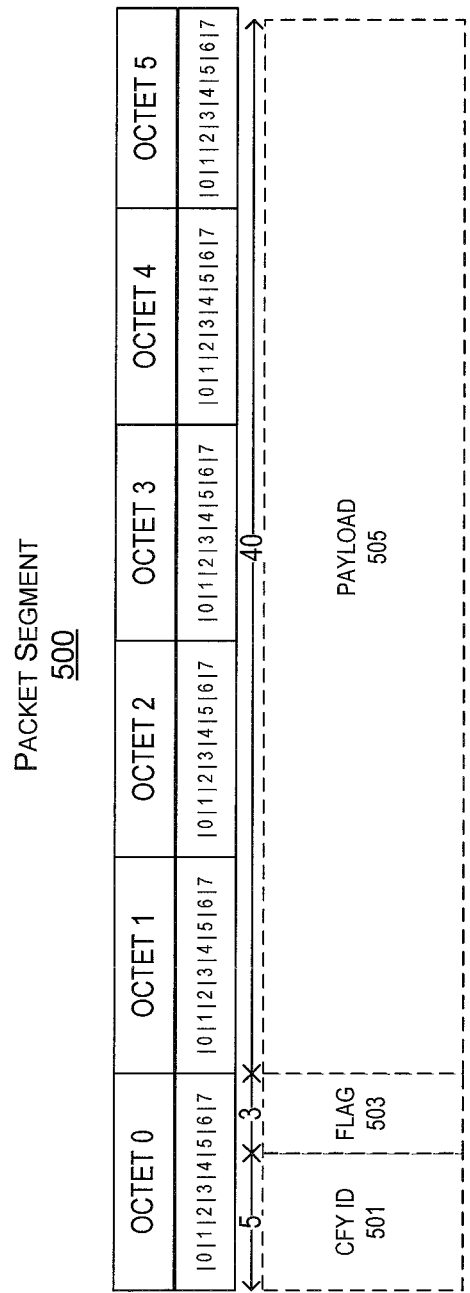
FIGS. 5A-5B are exemplary packet segments used to encode information, consistent with embodiments of the present disclosure.

As shown in FIG. 5A, packet segment 500 can be six octets long and divided into three different fields. The leftmost field in packet segment 500 can be a classifier identification field (CFY ID) 501. Classifier identification field can hold a string of five binary digits (bits) that can be used to uniquely identify one of the classifiers (e.g., classifier 311). Each classifier 311 can be assigned a unique classification identification either by an administrator, classifier 311, other components of appliance 108, appliance 108, or another appliance 108'.

As described above, classifier identification field 501 can vary in size. For example, increasing the classification identification field 501 by one binary digit (bit) increases the number of classifiers 311 that can be represented by this field from 32 to 64. Similarly decreasing classifier identification field 501 by one binary digit (bit) decreases the number of classifiers 311 from 32 to 16. The size of classification identification field 501 can be determined by an administrator, classifier 311, other components of appliance 108, appliance 108, or another appliance 108'.

Packet segment 500 can also include a flag field (FLAG) 503. Flag field 503 is comprised of three bits. The leftmost bit (i.e., bit 5 in octet 0) in flag field 503 can be used to indicate whether a message (e.g., link configuration message 600, service class configuration message 610, service class rate message 620, or in-band control message 630) is included in message body 509. A value of 1 can be used to indicate that a message is included, and a value of 0 can be used to indicate that a message is not included, or vice versa. The value can be determined by an administrator, classifier, an appliance, other components of an appliance, or another appliance.

The bit immediately to the right of the leftmost bit (i.e., bit 6 in octet 0), can be used to indicate that a MAC address has been administered either locally (e.g., by an administrator, an appliance, or components of the appliance), or universally (e.g., uniquely assigned by a manufacturer). A value of 1 can be used to indicate that the MAC address is administered locally, and a value of 0 can be used to indicate that the MAC address is administered universally, or vice versa. An administrator, a classifier, an appliance, other components of an appliance, or another appliance can determine the value.

The rightmost bit (i.e., bit 7 in octet 0) of flag field 503 can be used to indicate whether packet segment 500 is sent to a unicast address or a multicast address. In some embodiments a value of 1 can be used to indicate that packet segment 500 is sent to a multicast address, and a value of 0 can be used to indicate that packet segment 500 is sent to a unicast address. The value can be determined by an administrator, classifier, an appliance, other components of an appliance, or another appliance.

Packet segment 500 can also include a payload field 505. Payload field 505 can include a number of different messages each used to convey QoS policy enforcement information, as described below. Although payload field 505 can be used to transmit QoS policy information, it can also be used to communicate other information as well. For example, classifiers can share classification information with each other in order to parallelize the network traffic classification process.

It should be noted that the bits in each field can be read from the least significant bit to the most significant bit. In some other embodiments, the bits in each field can be read from the most significant bit to the least significant bit.

Figure 5B:
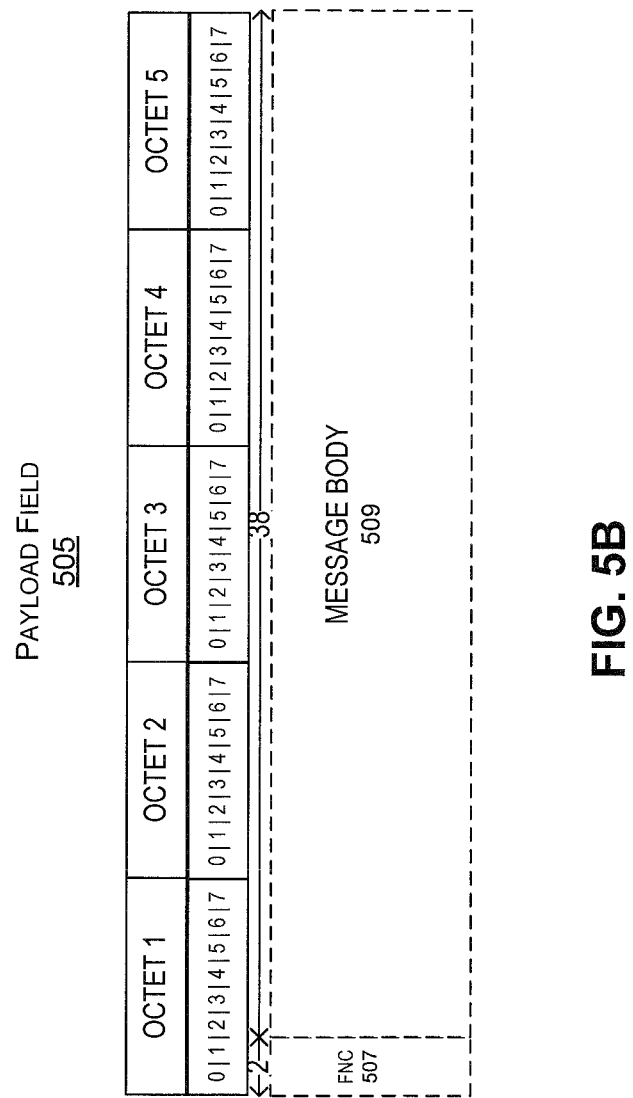

As shown in FIG. 5B, payload field 505 can be five octets in length and divided into two fields: function field (FNC)

507 and message body field 509. Function field 507 can be two bits in length and can occupy the first two bits of the leftmost octet (bits 0 and 1 of octet 1).

Function field 507 can be used to determine a type of message provided in message body field 509. For example, function field 507 can identify four types of messages. These types of messages can include a link configuration message, a service class configuration message, a service class rate message, or an in-band control message. Exemplary embodiments for each of these four messages are illustrated below in FIGS. 6A-6D. In function field 507, each message can be represented by one of the following binary digit (bit) tuples 00, 01, 10, or 11. It is appreciated that additional message types can be identified by function field 507 and that function field 507 can be more than two-bits.

It should be noted that the bits in each field can be read from the least significant bit to the most significant bit. In some other embodiments, the bits in each field can be read from the most significant bit to the least significant bit.

Figure 6A:
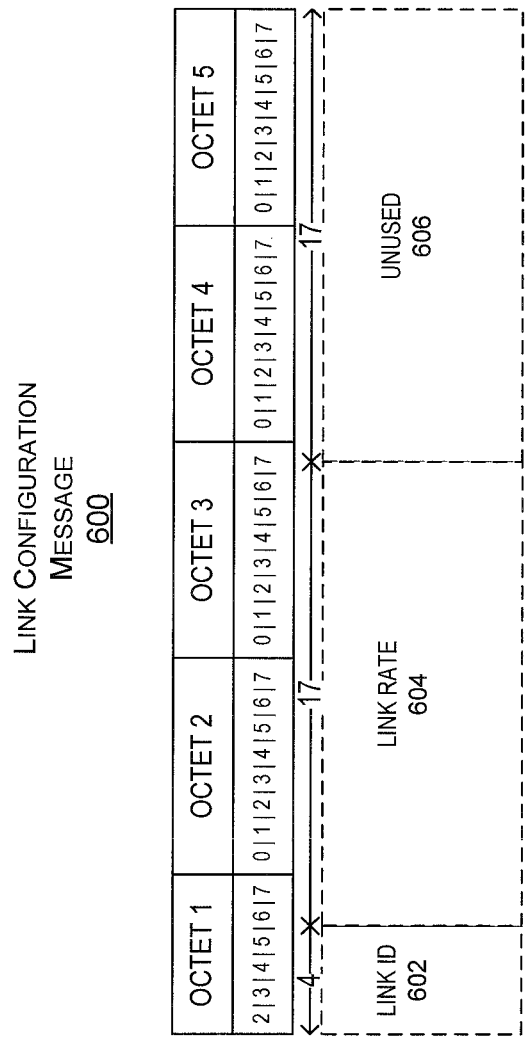
FIGS. 6A-6D are exemplary message bodies of packet segments illustrated in FIG. 5B, consistent with embodiments of the present disclosure.

An exemplary link configuration message 600 is shown in FIG. 6A. Link configuration message is used to specify the bandwidth available for a link. For example, one link can represent a connection between offices on two different continents, whereas another can represent a connection between offices in a city. Link configuration message 600 can include two or more fields, such as a link identifier field 602 and a link rate field 604. In some embodiments, link configuration message 600 can include a field that is not used (illustrated as unused field (UNUSED) 606) or include other fields.

Link identifier field 602 is used to uniquely identify a link associated with a link node (e.g., link node 410 of FIG. 4 representing a link between New York and Bangalore). While FIG. 6A shows that link identifier field 602 is four bits long (representing up to 16 different links), it is appreciated that the length of this field can be increased or decreased to accommodate any number of links.

Link rate field 604 provides a link rate of the link identified in link identifier field (LINK ID) 602. In the exemplary embodiment, link rate field 604 provides a value representing link rates that range from 50 kb per second (kbps) to 13.1 Gbps in increments of 50 kbps. The length of this field can be changed to increase or decrease the resolution of the data rate. For example, if the length of link rate field 604 is increased to 18 bits, 262,144 different data rates can be represented by this field. Accordingly, the link rate field (LINK RATE) 604 is not limited to the 131,072 different data rates corresponding to the 17 bits in this field. Moreover, the range of link rates and increments can also be configured and can vary from the example provided above.

Unused field 606 can be used to increase the length of link identifier and link rate fields 602 and 604, thereby allowing an administrator, classifier 311, other components of appliance 108, appliance 108, or another appliance 108' to increase the number of links in link identifier field 602 and the resolution of the data rate in link rate field 604. In other embodiments, unused field 606 can be used to transmit link metrics, including but not limited to latency or jitter experienced on a link, number of link segments a packet is expected to traverse, number of link segments a packet traverses, or any user defined metric describing the quality or characteristics of the link.

It should be noted that the bits in each field can be read from the least significant bit to the most significant bit. In some other embodiments, the bits in each field can be read from the most significant bit to the least significant bit.

Figure 6B:
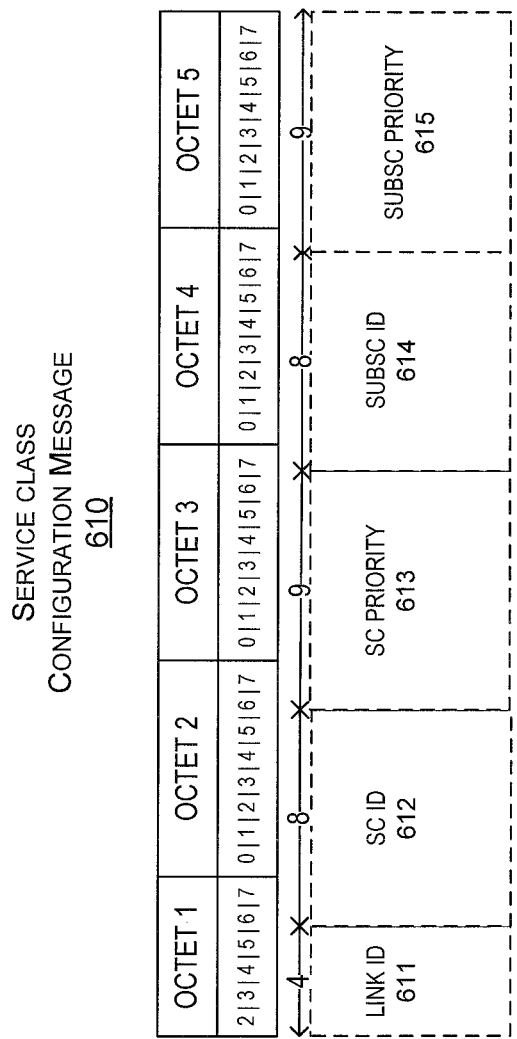

FIG. 6B illustrates an exemplary service class configuration message 610 provided in message body field 509, consistent with embodiments of the present disclosure. Service class configuration message 610 conveys priority and hierarchy information for a service class node and/or a sub-service class node in a classification tree 400. If multiple service class nodes and/or sub-service class nodes are provided in classification tree 400, multiple service class configuration messages can be used. Service class configuration message 610 can include a link identifier field (LINK ID) 611, a service class identifier field (SC ID) 612, and a service class priority field (SC PRIORITY) 613. In some embodiments, where a classification tree 400 corresponding to the link identified in link identifier field 611 includes or is intended to include sub-service classification nodes, service class configuration message 610 can include a sub-service class identifier field (SUBSC ID) 614 and sub-service class priority field (SUBSC PRIORITY) 615. In some embodiments, sub-service class identifier field 614 and sub-service class priority field 615 are not used.

Link identifier field 611 indicates the hierarchy associated with a link that a given service class belongs to. Link identifier field 611 can be four bits in length, which can be configured by an administrator, classifier 311, other components of appliance 108, appliance 108, or another appliance 108'.

Service class identifier field 612 uniquely identifies a service class associated with the link identified in link identified field 611. For example, service classes nodes SALES 430, ENGINEERING 440, and MANAGERS 420 can be assigned service class identifiers for a link connecting server 122 and client devices 102a-d. Service class identifier field 612 can be one octet in length, which can be adjusted.

Service class priority field 613 indicates the priority of a service class identified in service class identifier field 612. For example, service class SALES 430 can be assigned a higher priority if classifier 311 determines that more packets associated with service class ENGINEERING 440 are being processed at the expense of packets in service class SALES 430. In some embodiments, priority can be based on required throughput for a service class, number of packets in a service class that are corrupted during transmission, latency and jitter experienced by packets in a service class during transmission, or number of packets in a service class that arrive out of order at a destination. The priority can also be based on a combination of the aforementioned metrics, user defined metrics, or metrics defined autonomously by classifier 311, other components of appliance 108, appliance 108, or another appliance 108'. Service class priority field 613 is nine bits in length, which can be adjusted by an administrator, classifier 311, other components of appliance 108, appliance 108, or another appliance 108'.

Sub-service class identifier field 614 identifies service classes that are hierarchically below the service classes mentioned above. Using FIG. 4 as an example, service class configuration message 610 can include a value assigned to email 431 generated by client devices in service class SALES 430. Sub-service class identifier field 614 can be an octet in length, which can be adjusted.

Sub-service class priority field 615 provides a priority associated with the sub-service class identified in sub-service class identifier field 614. For example, sub-service class VoIP 434 in service class SALES 430 can be assigned a higher priority than other sub-service classes under service class SALES 430. For example, if classifier 311 determines that more packets associated with sub-service class VoIP 434 are being processed at the expense of packets in sub-service classes web 432, email 431, and sales tools 433, VoIP 434 can be given a higher priority. In other embodiments, priority can be based on throughput required for a sub-service class, number of packets in a sub-service class that are corrupted during transmission, latency and jitter experienced by packets in a sub-service class during transmission, or number of packets in a sub-service class that arrive out of order at a destination. The priority can also be based on a combination of the aforementioned metrics, user defined metrics, metrics defined autonomously by classifier 311, other components of appliance 108, appliance 108, or another appliance 108'. Sub-service class priority field 615 is nine bits in length, which can be adjusted.

It should be noted that the bits in each field can be read from the least significant bit to the most significant bit. In some other embodiments, the bits in each field can be read from the most significant bit to the least significant bit.

Figure 6C:
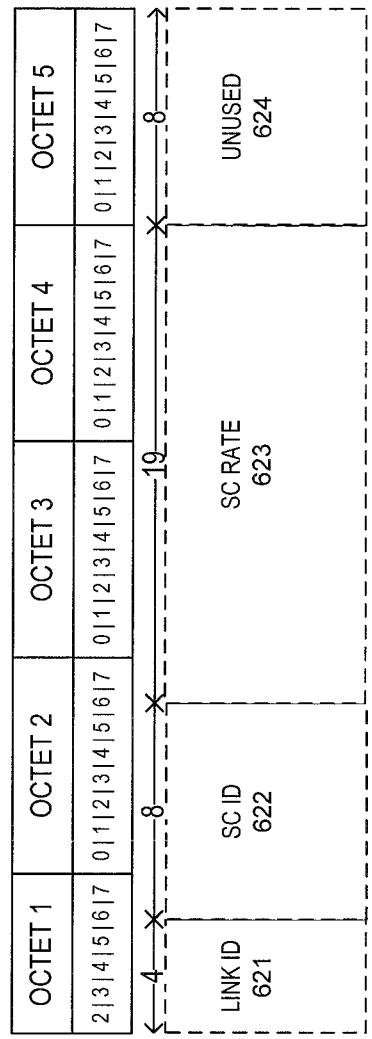

FIG. 6C illustrates an exemplary service class rate message 620 provided in message body field 509, consistent with embodiments of the present disclosure. Service class rate message 620 conveys priority and hierarchy information for each node in a classification tree 400 based on a data rate associated with a service class. Service class rate message 620 can include a link identifier field (LINK ID) 621, a service class identifier field (SC ID) 622, service class rate field (SC RATE) 623, and unused field (UNUSED) 624.

Link identifier field 621 indicate the hierarchy associated with a link that a given service class belongs to. Link identifier field 621 is four bits in length, which can be adjusted by an administrator, classifier 311, other components of appliance 108, appliance 108, or another appliance 108'

Service class identifier field 622 provides a value that uniquely identifies a service class associated with the link identified in link identifier field 621. For example, service classes nodes SALES 430, ENGINEERING 440, and MANAGERS 420 can be assigned service class identifiers for a link connecting server 122 and client devices 102*a*-*d*. Service class identifier field 622 is one octet in length, which can be adjusted.

Service class rate field 623 provides a regulated rate for a service class. The regulated rate can be set by an administrator, classifier 311, other components of appliance 108, appliance 108, or another appliance 108'. In the exemplary embodiment, service class rate field 623 provides a value representing link rates that range from 50 kb per second (kbps) to 13.1 Gbps in increments of 50 kbps. The length of this field can be changed to increase or decrease the resolution of the data rate. For example, if the length of service class rate field 623 is increased to 20 bits, 1,048,576 different data rates can be represented by this field. Accordingly, the link rate field 623 is not limited to the 524,288 different data rates corresponding to the 19 bits in this field. Moreover, the range of link rates and increments can also be configured and can vary from the example provided above. Service class rate field 623 is nineteen bits in length, which can be adjusted.

Unused field 624 is an octet in length and can be used to increase the length of fields 621, 622, and 623, thereby allowing an administrator, classifier 311, other components of appliance 108, appliance 108, or another appliance 108' to increase the number of links identified by link identifier field 621, service classes identified by service class identified field 622, and the resolution of the data rate identified by service class rate field 623. In other embodiments unused field 624 can be used to transmit link metrics, including but not limited to latency or jitter experienced on a link, number of link segments a packet is expected to traverse, number of link segments a packet traverses, or any user defined metric describing the quality or characteristics of the link.

It should be noted that the bits in each field can be read from the least significant bit to the most significant bit. In some other embodiments, the bits in each field can be read from the most significant bit to the least significant bit.

Figure 6D:
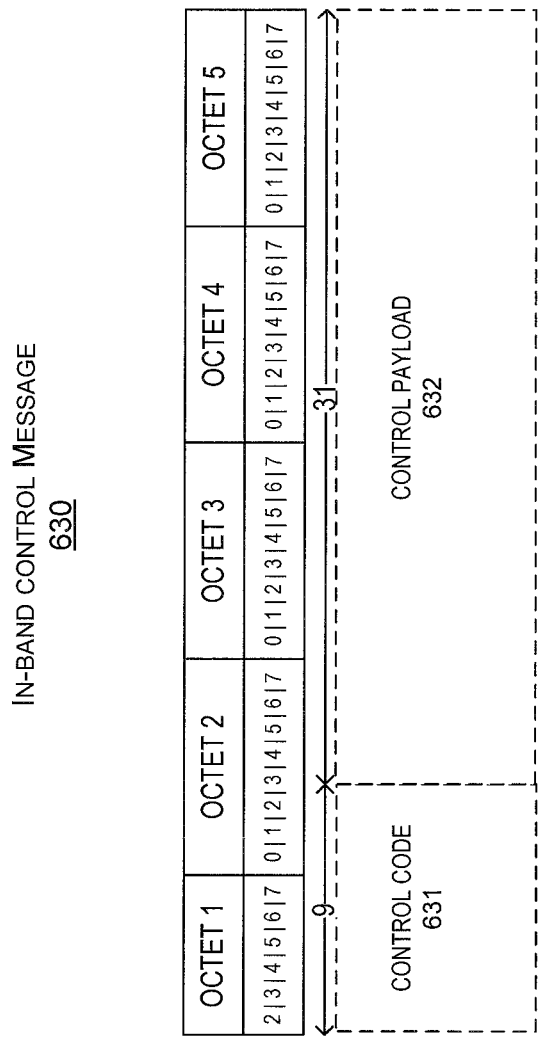

FIG. 6D illustrates an exemplary in-band control message 630 provided in message body field 509, consistent with embodiments of the present disclosure. In-band control message 630 conveys information about changes to QoS enforcement policies. In-band control message 630 includes a control code field (CONTROL CODE) 631 and control payload field (CONTROL PAYLOAD) 632.

Control code field 631 can specify the message type and indicate how control payload field 632 should be used. In some embodiments, control payload field 632 is not used at all. A value of 0, 1, or 2 can be used in control code field 631 to indicate the message type. Control code field 631 can be nine bits in length, which can be further adjusted.

Control code field 631 with a value of 0 can indicate a protocol version message. A protocol version message is used to indicate which QoS policy version number is being used. For example, classifier 311 can send an in-band control message to other classifiers or QoS engine 310 with control code field 631 equal to 0 indicating that the classifiers or QoS engine 310 should use the policy corresponding to the version number included in control payload field 632. For instance, classifier 311 could send an in-band control message to other classifiers and QoS engine 310 with a version number corresponding to a previously used policy. After receipt of the message, the other classifiers and QoS engine 310 will use the policy identified by the version number sent in the message.

A control code field 631 with a value of 1 can indicate that all QoS enforcement policies should be deleted. For example, classifier 311 can send an in-band control message to other classifiers or QoS engine 310 with control code field 631 equal to 1 indicating that the classifiers or QoS engine 310 should delete all QoS enforcement policies. For instance, classifier 311 could send an in-band control message to other classifiers and QoS engine 310 because an administrator, classifier 311, other components of appliance 108, appliance 108, or another appliance 108' could determine that all previous policies are no longer necessary and should be expunged from any buffers in memory 222 to save space in memory 222.

A control code field 631 with a value of 2 can indicate that all QoS enforcement policy information associated with a connection should be removed. For example, classifier 311 can send an in-band control message to QoS engine 310 with control code field 631 equal to 2 indicating that all policy information associated with a connection be removed. For instance, classifier 311 can send an in-band control message to QoS engine 310 with control code field 631 equal to 2, indicating the removal of all policy information on a connection associated with a client device in service class SALES 430 using an email application in sub-service class email 431.

It should be noted that the bits in each field can be read from the least significant bit to the most significant bit. In some other embodiments, the bits in each field can be read from the most significant bit to the least significant bit.

Figure 7:
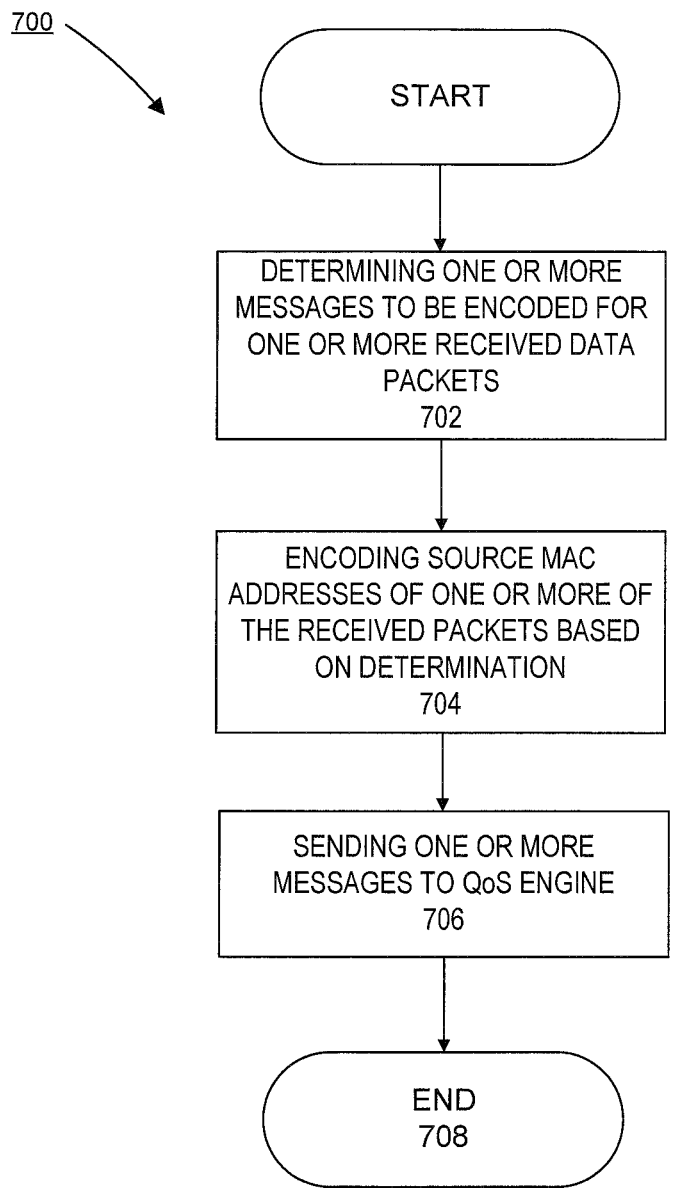
FIGS. 7-8B are flowcharts representing exemplary methods for transmitting Quality of Service information between devices, consistent with embodiments of the present disclosure.

FIG. 7 is a flowchart representing an exemplary method 700 for transmitting QoS information between devices, consistent with embodiments of the present disclosure. Referring to FIG. 7, it will be readily appreciated that the illustrated procedure can be altered to delete steps or further include additional steps. The flowchart provides exemplary steps for a classifier (e.g., classifier 311) to generate an in-band classification message.

Before initiating method 700, an appliance (e.g., appliance 108 or 108') can receive network traffic from devices in the network and analyze received packets of the network traffic. The analysis can include measuring the incoming flow of packets (i.e., number of packets per unit of time), the statistical distribution of packets arriving at an appliance associated with a particular application, the source IP address of the packets, the destination FP address of the packets, the source MAC address of the packets, the destination MAC address of the packets, the inter-arrival times of packets across all applications, inter-arrival times of packets generated by certain devices (e.g., desktop computer, laptop computer, mobile phone, personal data assistant, tablet, etc.) Using this analysis, a classifier can classify the received packets, based on the analysis of the traffic and any other information provided by an administrator, an appliance, or components of the appliance.

Using the analysis, the appliance can create a classification tree (e.g., classification tree 400) based on the analysis. The classifier, which is part of the appliance, can create the classification tree or can receive the classification tree, or a portion of the classification tree, from some other component of the appliance. While the classifier receives or acquires the classification tree, or a portion of the classification tree, other classifiers in the appliance can also receive or acquire the classification tree, or a portion of the classification tree, for consistency purposes.

After the classification tree has been generated, a classifier can send information, (e.g., policy) based on the classification tree, in the source MAC address of a packet header to other classifiers or QoS engines (e.g., QoS engine 310).

To send information about the classification tree to other classifiers or QoS engines, a classifier determines which one or more messages to use, in step 702, to encode information associated with the classification of one or more received data packets in accordance with the classification tree. In some embodiments a classification tree can be used to create QoS enforcement policy information as described in FIG. 8A and FIG. 8B. For example, the policy information can include a set of instructions used to enforce the prioritization of packets passing through a QoS engine in accordance with the classification tree before they are sent to a network (e.g., network 104 or 110) through a network interface (e.g., network interface 218A). The policy can be communicated to the QoS engine using an in-band control message 630. In-band control message 630 can convey information about changes to QoS enforcement policies.

After the message type has been determined, the classifier can encode the source MAC addresses of one or more of the received packets for the one or more messages (704). Each message can include the encoded source MAC address (e.g., packet segment 500 or portions thereof) as provided in FIGS. 5A-6D or variations described herein.

After the one or more messages have been encoded, the classifier can send the one or more messages to a QoS engine (706). In some embodiments, the message replaces the source MAC address portion of the entire packet to the QoS engine so that no extra data is added to the network. In other embodiments, the message can be transmitted alone without the remainder of a standard or nonstandard OSI data packet to the QoS engine. For example, only the source MAC address field of a packet can be sent. In some embodiments, only the MAC header (i.e., source and destination MAC addresses) of a packet can be sent with the source MAC address encoded with the message. Moreover, in some embodiments, the message can be included as a configuration information portion of a scheduling request, as further described in application Ser. No. 13/963,936, which is hereby incorporated by reference. After sending the message, the classifier can receive a next packet for processing and then method 700 can end in step 708.

Figure 8A:
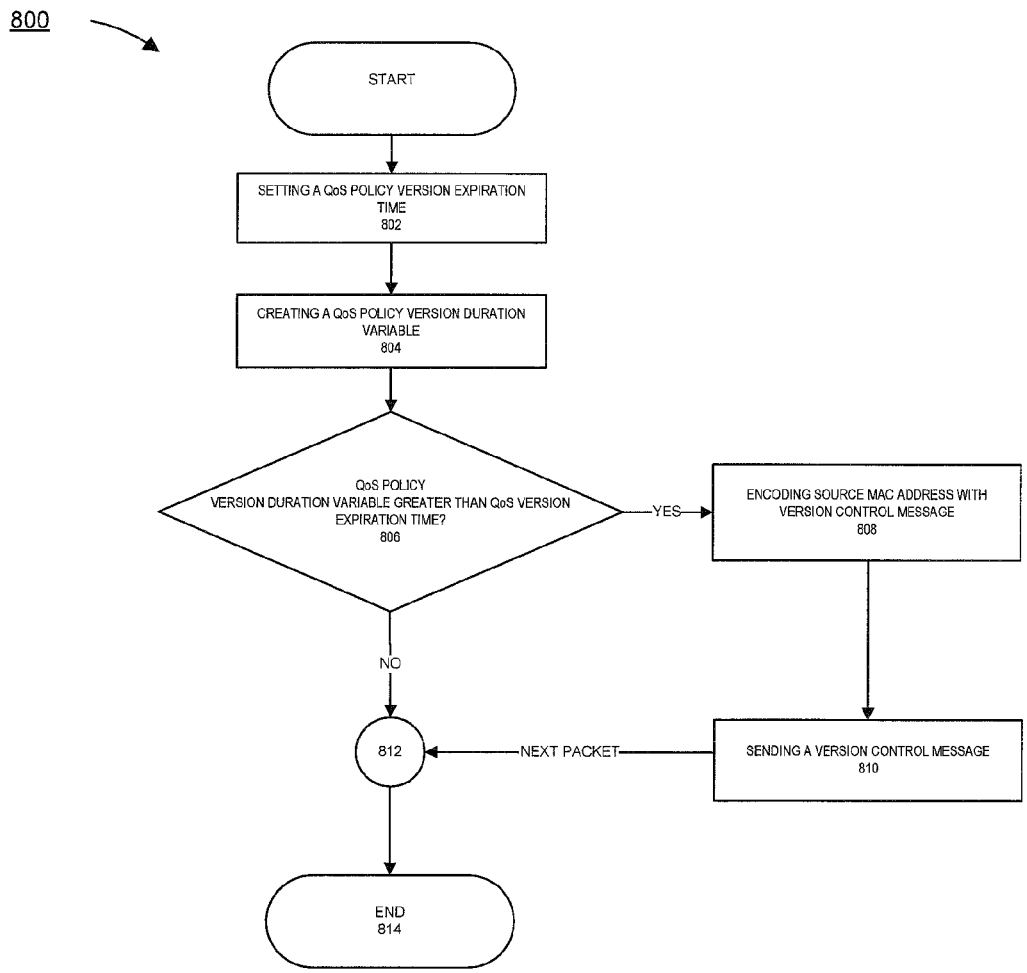

FIG. 8A is a flowchart representing an exemplary method for transmitting QoS information between devices, consistent with embodiments of the present disclosure. It is appreciated that the flowchart of FIG. 8A is an embodiment of the flowchart in FIG. 7. As mentioned above, a classification tree (e.g., classification tree 400) can be used to create QoS enforcement policy information that can be used by a QoS engine to enforce the prioritization of packets. Method 800 describes a method, performed by a classifier, to communicate QoS enforcement policy information to a QoS engine.

Before initiating method 800, a classifier can create a QoS policy based on classification of network traffic in accordance with the classification tree.

After a QoS policy has been created, a classifier can set a QoS policy version expiration time in step (802). QoS policy version expiration time can be set by an administrator, a classifier, components of an appliance, or an appliance. In some embodiments, QoS policy version expiration time can be determined by the analysis of network traffic by a classifier. A classifier can increase or decrease the QoS policy version expiration time if the incoming network traffic associated with different user applications begins to fluctuate. For example, a classifier can receive packets, of different types, within a given period, and switch between several policies at an increasing rate based on the type of incoming packets as they are being received. For instance, two client devices (e.g., client devices 102b and 102f) can send a stream of email packets to two different classifiers, respectively. After twenty-five email packets have been received, a previously created packet enforcement policy can be used to prioritize the subsequent packets. The classifiers can then set a policy version expiration time and continue to analyze the remaining incoming packets. As the remaining email packets are being received and analyzed, the classifiers can simultaneously receive VoIP packets. After the first fifteen packets have been received, the classifiers can switch to another packet enforcement policy based on the first fifteen VoIP packets and the remaining email packets. As a result, a new policy version expiration time can be set (e.g., increased). While the remaining email and VoIP packets are being received, the classifiers can simultaneously receive multimedia packets (e.g., video conferencing packets). After the first five packets have been received, the classifiers can switch to another packet enforcement policy based on the first five multimedia packets, and the remaining email and VoIP packets. As a result a new policy version expiration time can be set (e.g., increased). In this example, the policy version expiration time is increased to accommodate the increasing rate with which different packet types arrive at the classifiers. The expiration time, however, could be decreased or set to a random value determined by an administrator, components of an appliance, or an appliance.

In step 804, a QoS policy version duration variable is created to determine when a policy has expired. The QoS policy version duration variable is incremented by a predetermined unit of time until the value of the QoS policy version duration variable exceeds the QoS policy version expiration time. The unit of time can be determined by an administrator, a classifier, components of an appliance, an appliance, or any other network device authorized to determine the unit of time. In some embodiments, the unit of time can be specified by a Network Time Protocol (NTP) used to synchronize clocks over packet-switched networks.

After the QoS policy version expiration time has been determined and a version duration variable has been created, the classifier can determine whether the QoS version duration variable exceeds the QoS version expiration time in step 806.

If the QoS version duration variable exceeds the QoS version expiration time, a classifier can encode the source MAC address of the received packet with a version control message specifying a QoS policy version number that a QoS engine can use to enforce the received packet, and any subsequent packets (808). The classifier can use the message format displayed in FIG. 6D or a variation thereof. As illustrated in FIG. 6D, the classifier can specify a version control message in the source MAC address by setting the control code field 631 to zero and setting the control payload field 632 to a QoS policy version number specified by the classifier, components of an appliance, an appliance, any network device authorized to set the control code field 631 and control payload field 632, or any combination of the aforementioned.

After both fields have been set, a classifier can send the received packet to a QoS engine (e.g., QoS engine 310), in step 810, with the source MAC address encoded with a version control message as explained above in step 808. For example, when a classifier receives a packet associated with an instant messaging program and the QoS version duration variable exceeds the QoS version expiration time, the source MAC address of the incoming instant messaging packet can be encoded with a version control message by setting control code field 631 to a value of zero and including a QoS policy version in control payload field 632. The QoS policy version number can be specified by a classifier, components of an appliance, an appliance, any network device authorized to set the control code and control payload fields, or any combination of the aforementioned. After the source MAC address has been encoded with the version control message, the classifier can send the message to the QoS engine 310, which can enforce a policy for sending a packet associated with the message, along with any subsequent packets, according to the version control message encoded in the source MAC address. After the sending of the message, the method can proceed to connection 812 and then proceed to end (814).

If, however, the QoS version duration variable does not exceed the QoS version expiration time, the method can proceed to connection 812 and then proceed to end (814).

Figure 8B:
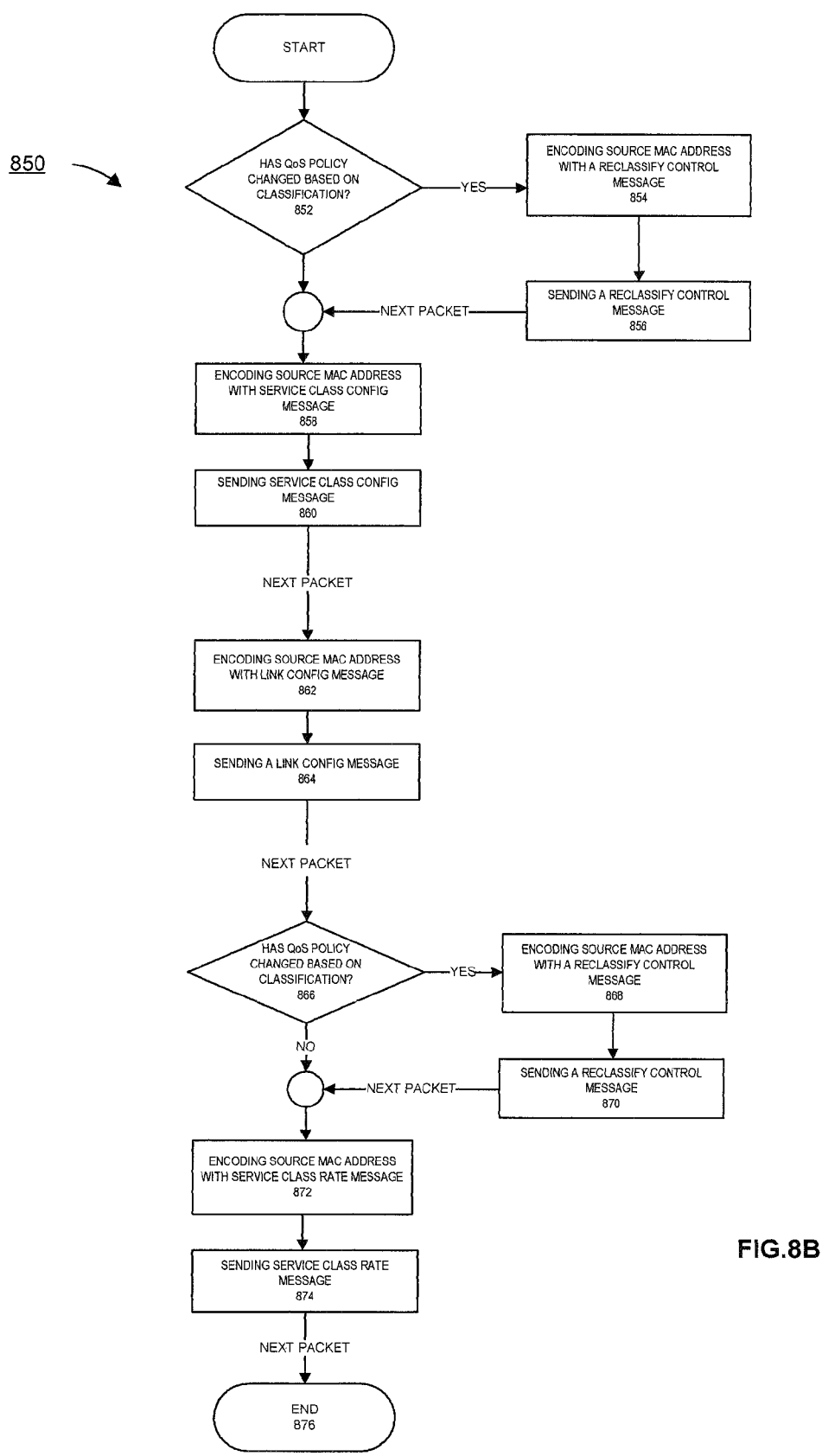

FIG. 8B is a flowchart representing an exemplary method for transmitting QoS information between devices, consistent with embodiments of the present disclosure. It is appreciated that the flowchart of FIG. 8B is an embodiment of the flowchart in FIG. 7. In some embodiments, FIG. 8B is an extension of FIG. 8A. As mentioned above, a classification tree can be used to create a QoS enforcement policy information that can be used by a QoS engine to enforce the prioritization of packets in accordance with the classification tree. Method 850 describes a method, performed by a classifier, to communicate QoS enforcement policy information to a QoS engine.

After an initial start step, the classifier can determine whether a QoS policy has changed based on the classification of a packet received at step 852. The change may involve updating a current QoS policy or simply creating a new one. The classifier's QoS policy can be shared with other classifiers and with the QoS engine for purposes of having a consistent enforcement policy at the QoS engine. The sharing of the classifier's QoS policy with the QoS engine is further described below.

If changes have been made to the policy, the classifier can encode the source MAC address of the received packet with a reclassify connection control message (854). The reclassify connection control message specifies that all QoS enforcement policy information associated with a connection should be removed from the QoS engine. Classifiers can use the message format displayed in FIG. 6D or a variation thereof. As illustrated in FIG. 6D, the classifier can specify a reclassify connection message in the source MAC address by setting the control code field 631 to two, and leaving the control payload field 632 empty.

After encoding the source MAC address of the received packet with a reclassify connection control message, a classifier can send the reclassify control message to the QoS engine (856).

For example, when the classifier receives a packet associated with an email program, and a QoS policy has changed based on the classification of the packet, the source MAC address of the incoming email packet, can be encoded as a reclassify connection message with control code field 631 set to a value of two, and control payload field 632 left empty. After the source MAC address has been encoded with the reclassify connection message, the classifier can send the packet to the QoS engine, where the connection associated with the received packet can have all policy information removed. For instance, the classifiers can maintain a classification tree 400 with an email sub-service class 421 containing several thousand connections (not shown) to a WAN. If an administrator, a classifier, components of an appliance, or an appliance determines that a connection supporting email sub-service class 421 should have a policy removed, a reclassify connection control message can be sent from the classifiers to the QoS engine instructing the QoS engine to remove the corresponding policy. The decision to remove a policy from a connection can be based on link metrics, behavior of traffic generated by client devices, etc.

After sending the reclassify control message at step 856 and receiving a next packet or if the QoS policy has not changed at step 852 (continue processing the current packet analyzed at step 852), the classifier encodes the source MAC address field of the packet (i.e., the current packet from step 852 or the next packet received after step 856) with a service class configuration message at step 858.

The classifier can use the format of the service class configuration displayed in FIG. 6B. For example, a classifier can specify a link (e.g., New York to Bangalore) using link identifier field 611, specify a service class (e.g., SALES 430) using service class identifier field 613, specify a service class priority value (e.g., packets associated with SALES 430 have a lower priority than packets associated with ENGINEERING 440, but a higher priority than packets associated with MANAGEMENT 420), specify a sub-service class (e.g., email 431), and sub-service class priority (e.g., VoIP packets have a higher priority than email packets), and encode these values in the source MAC address.

After the service class configuration message has been encoded in the source MAC address of the received packet, the classifier can send the service class configuration message to the QoS engine in step 860.

After the packet has been sent, the classifier can receive the next packet, the classifier can encode the source MAC address of that packet for creating a link configuration message, in step 862. Classifiers can use the message format of the link configuration message displayed in FIG. 6A. For example, a classifier can specify a link (e.g., New York to Bangalore) using link identifier field 602, specify a link rate (e.g., 1 Gbps) using link rate field 604, and specify any additional information provided by an administrator, components of an appliance, or an appliance in unused field 606.

After the link configuration message has been encoded in the source MAC address, the classifier can send the link configuration message to the QoS engine in step 864. It is appreciated that the link configuration message can be encoded and sent before the encoding and sending of the service class configuration message.

After the link configuration message has been sent and the next packet received, the classifier can determine whether the QoS policy has changed based on the classification of that received packet in step 866.

If one or more changes have been made to the policy, the classifier can encode the source MAC address of the received packet with a reclassify connection message specifying that all QoS enforcement policy information associated with a connection should be removed from the QoS engine (868) and send the reclassify connection message to QoS engine (870). Steps 866, 868, and 870 are similar to steps 852, 854, and 856 referred to above.

After sending the reclassify control message at step 870 and receiving a next packet or if the QoS policy has not changed at step 866 (continue processing the current packet analyzed at step 866), the classifier encodes the source MAC address field of the packet (i.e., the current packet from step 866 or the next packet received after step 870) with a service class rate message in step 872. The classifier can use the message format of the service class rate message displayed in FIG. 6C or variations thereof. For example, a classifier can specify a link (e.g., New York to Bangalore) using link identifier field 621, specify a service class (e.g., SALES 430) using service class identifier field 622, and specify a service class rate (e.g., 1 Gbps) using service class rate identifier field 623.

After the service class rate message has been encoded in the source MAC address of the received packet, the classifier can send the service class rate message to the QoS engine in step 874, and the method can end (876).

The methods disclosed herein can be implemented as a computer program product comprising computer-readable instructions. Computer-readable instructions can be stored on a tangible non-transitory computer-readable medium, such as a flexible disk, a hard disk, a CD-ROM (compact disk-read only memory), an MO (magneto-optical) disk, DVD-ROM (digital versatile disk-read only memory), a DVD RAM (digital versatile disk-random access memory), or a semiconductor memory. Alternatively, the methods can be implemented in hardware components or combinations of hardware and software of a data processing apparatus, e.g., a programmable processor, a computer, or multiple computers. The computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An appliance having a memory and one or more processors, the appliance comprising:
   a quality-of-service (QoS) engine configured to authorize the transmission of data packets according to a hierarchical classification tree;
   a classifier configured to:
      receive at least one data packet having a source media access control (MAC) address;
      alter the source MAC address with an encoded value based on a determination on a type of at least one message, wherein the encoded value includes configuration information for the hierarchical classification tree; and
      provide the at least one data packet that contains the encoded value to configure the hierarchical classification tree accessible by the QoS engine.

2. The appliance of claim 1, wherein the hierarchical classification tree comprises a link node, one or more service class nodes that are descendants of the link node, and one or more connection nodes that represent network connections and that are descendants of the one or more service class nodes.

3. The appliance of claim 2, wherein the classifier encodes the source MAC address based on the determination that a policy associated with the hierarchical classification tree has changed.

4. The appliance of claim 3, wherein the encoded source MAC address includes a link configuration message identifying a link associated with the link node.

5. The appliance of claim 4, wherein the encoded source MAC address further includes link rate information associated with the link.

6. The appliance of claim 3, wherein the encoded source MAC address includes a service class message identifying a service class associated with one of the one or more service class nodes.

7. The appliance of claim 6, wherein the encoded source MAC address further includes service class priority information associated with the service class.

8. The appliance of claim 6, wherein the encoded source MAC address further includes service class rate information associated with the service class.

9. The appliance of claim 6, wherein the encoded source MAC address further includes a link identifier associated with the link node.

10. The appliance of claim 1, wherein the classifier encodes the source MAC address based on the determination that a policy version duration has expired.

11. The appliance of claim 10, wherein the provided encoded source MAC address includes a version control message.

12. The appliance of claim 1, wherein the provided encoded source MAC address is part of a data packet, or a representation of a data packet, that is provided to the QoS engine.

13. A method for configuring a hierarchical classification tree, the method performed by an appliance having one or more processors and comprising:
receiving at least one data packet having a source media access control (MAC) address;
altering the source MAC address with an encoded value based on a determination on a type of at least one message, wherein the encoded value includes configuration information; and
providing the at least one data packet that contains the encoded value to configure the hierarchical classification tree used by a quality of service (QoS) engine for authorizing the transmission of one or more data packets.

14. The method of claim 13, wherein the hierarchical classification tree comprises a link node, one or more service class nodes that are descendants of the link node, and one or more connection nodes that represent network connections and that are descendants of the one or more service class nodes.

15. The method of claim 14, wherein encoding the source MAC address is based on the determination that a policy associated with the hierarchical classification tree has changed.

16. The method of claim 15, wherein encoding the source MAC address further comprises encoding the source MAC address to include a link configuration message identifying a link associated with the link node.

17. The method of claim 16, wherein encoding the source MAC address further comprises encoding the source MAC address to include link rate information associated with the link.

18. The method of claim 15, wherein encoding the source MAC address further comprises encoding the source MAC address to include a service class message identifying a service class associated with one of the one or more service class nodes.

19. The method of claim 18, wherein encoding the source MAC address further comprises encoding the source MAC address to include service class priority information associated with the service class.

20. The method of claim 18, wherein encoding the source MAC address further comprises encoding the source MAC address to include service class rate information associated with the service class.

21. The method of claim 18, wherein encoding the source MAC address further comprises encoding the source MAC address to include a link identifier associated with the link node.

22. The method of claim 13, wherein encoding the source MAC address is based on the determination that a policy version duration has expired.

23. The method of claim 22, wherein encoding the source MAC address further comprises encoding the source MAC address to include a version control message.

24. The method of claim 13, wherein providing the encoded source MAC address further comprises providing the encoded source MAC address in the at least one data packet or a representation of the at least one data packet to the QoS engine.

25. A non-transitory computer readable storage medium storing a set of instructions that are executable by at least one processor of an appliance to cause the appliance to perform a method for configuring a hierarchical classification tree, the method comprising:
receiving at least one data packet having a source media access control (MAC) address;
altering the source MAC address with an encoded value based on a determination on a type of at least one message, wherein the encoded value includes configuration information; and
providing the at least one data packet that contains the encoded value to configure the hierarchical classification tree used by a quality of service (QoS) engine for authorizing the transmission of one or more data packets.

26. The computer readable storage medium method of claim 25, wherein the hierarchical classification tree comprises a link node, one or more service class nodes that are descendants of the link node, and one or more connection nodes that represent network connections and that are descendants of the one or more service class nodes.

27. The computer readable storage medium method of claim 26, wherein encoding the source MAC address is based on the determination that a policy associated with the hierarchical classification tree has changed.

28. The computer readable storage medium method of claim 27, wherein encoding the source MAC address further comprises instructions for encoding the source MAC address to include a link configuration message identifying a link associated with the link node.

29. The computer readable storage medium method of claim 28, wherein encoding the source MAC address further comprises instructions for encoding the source MAC address to include link rate information associated with the link.

30. The computer readable storage medium method of claim 27, wherein encoding the source MAC address further comprises instructions for encoding the source MAC address to include a service class message identifying a service class associated with one of the one or more service class nodes.

31. The computer readable storage medium method of claim 30, wherein encoding the source MAC address further comprises instructions for encoding the source MAC address to include service class priority information associated with the service class.

32. The computer readable storage medium method of claim 30, wherein encoding the source MAC address further comprises instructions for encoding the source MAC address to include service class rate information associated with the service class.

33. The computer readable storage medium method of claim 25, wherein encoding the source MAC address is based on the determination that a policy version duration has expired.

34. The computer readable storage medium method of claim 33, wherein encoding the source MAC address further comprises instructions for encoding the source MAC address to include a version control message.

35. The appliance of claim 1, wherein the message is one of a link configuration message, a service class configuration message, a service class rate message, and an in-band control message.

* * * * *